US012640676B2

(12) United States Patent　　　(10) Patent No.: US 12,640,676 B2
Petkanchin　　　　　　　　　　　(45) Date of Patent: May 26, 2026

(54) SYSTEM AND METHOD TO SET UP AN AUTONOMOUS PHOTOVOLTAIC POWER STATION

(71) Applicant: NRG Tech Ltd., Sofia (BG)

(72) Inventor: Lachezar Petkanchin, Sofia (BG)

(73) Assignee: NRG Tech Ltd., Sofia (BG)

( * ) Notice: Subject to any disclaimer, the term of this patent is extended or adjusted under 35 U.S.C. 154(b) by 0 days.

(21) Appl. No.: 19/159,283

(22) PCT Filed: Sep. 27, 2024

(86) PCT No.: PCT/EP2024/077243

§ 371 (c)(1),
(2) Date: Aug. 22, 2025

(87) PCT Pub. No.: WO2026/067981

PCT Pub. Date: Apr. 2, 2026

(65) Prior Publication Data

US 2026/0121574 A1　　Apr. 30, 2026

(51) Int. Cl.
H02S 10/40 (2014.01)
B25J 5/00 (2006.01)
(Continued)

(52) U.S. Cl.
CPC ............... H02S 10/40 (2014.12); B25J 5/007 (2013.01); B25J 9/1687 (2013.01);
(Continued)

(58) Field of Classification Search
None
See application file for complete search history.

(56) References Cited

U.S. PATENT DOCUMENTS

2017/0043700 A1　2/2017　French et al.
2020/0350850 A1　11/2020　Stefano et al.

FOREIGN PATENT DOCUMENTS

CN　　117353646 B　　5/2024
DE　102012025534 A1　7/2014
(Continued)

OTHER PUBLICATIONS

International Search Report & Written Opinion, PCT Application No. PCT/EP2024/077243, dated May 20, 2025, 13 pgs.

*Primary Examiner* — Eli S Mekhlin
(74) *Attorney, Agent, or Firm* — Duane Morris LLP

(57)　　　　ABSTRACT

System to set up an autonomous temporary solar farm, comprising a multitude of photovoltaic power modules (1, 1', 1") and a multitude of battery modules (2, 2', 2"), wherein the photovoltaic power modules (1, 1', 1") and the battery modules (2, 2', 2") each comprise compatible electrical DC connectors (3, 3'), so that the battery modules (2, 2', 2") can be electrically connected to and charged by the photovoltaic power modules (1, 1', 1"), wherein the system comprises at least one magazine (4) adapted to hold both the photovoltaic power modules (1, 1', 1") and the battery modules (2, 2', 2"), at least one robotic vehicle (5) comprising a holding platform (6) to hold the magazine (4), and a manipulator mechanism (8) that is adapted to extract a photovoltaic power module (1, 1', 1") and/or a battery module (2, 2', 2") from the magazine (4) and place it on a ground surface, and/or pick up a photovoltaic power module (1, 1', 1") and/or a battery module (2, 2', 2") from a ground surface and insert it into the magazine (4).

13 Claims, 9 Drawing Sheets

(51) Int. Cl.
    *B25J 9/16*      (2006.01)
    *B25J 15/00*     (2006.01)
    *H02S 20/30*    (2014.01)
    *H02S 30/10*    (2014.01)
    *H02S 40/36*    (2014.01)
    *H02S 40/38*    (2014.01)

(52) U.S. Cl.
    CPC ........... *B25J 15/0014* (2013.01); *H02S 20/30*
        (2014.12); *H02S 30/10* (2014.12); *H02S 40/36*
               (2014.12); *H02S 40/38* (2014.12)

(56)               References Cited

FOREIGN PATENT DOCUMENTS

| | | | |
|---|---|---|---|
| WO | WO-2017161358 A2 * | 9/2017 | ............ H02S 40/36 |
| WO | 2024050449 A2 | 3/2024 | |

* cited by examiner

1

SYSTEM AND METHOD TO SET UP AN AUTONOMOUS PHOTOVOLTAIC POWER STATION

RELATED APPLICATIONS

This application is a national stage entry of International Patent Application No. PCT/EP2024/077243, filed on Sep. 27, 2024, the entire contents which are hereby incorporated herein by reference as if fully set forth herein.

The invention relates to a system and a method to set up an autonomous temporary photovoltaic power station.

It is known from the prior art to arrange photovoltaic modules in photovoltaic power stations (so-called solar farms) on open spaces such as agricultural lands or construction sites. Solar farms are typically stationary, with photovoltaic modules being fixed to the ground or roofs of buildings. Further, solar farms are typically set up in places that are far away from electric power consumers. Solar farms are also hard to maintain, and the land beneath the photovoltaic power modules is lost for other purposes.

On the other hand, there are many cases when open areas both within city limits and outside of cities remain unused for long time. These include car parks near offices or factories during public holidays; open sport or entertainment facilities, when no events take place; airports' large service areas during periods with fewer flights; agricultural land after crop was harvested, and many more. However, current solar farm installations cannot be used on land plots that are only temporarily available.

BRIEF DESCRIPTION OF THE DRAWINGS

Example embodiments will now be described by way of non-limiting examples with reference to the accompanying drawings, in which.

Figure 1:
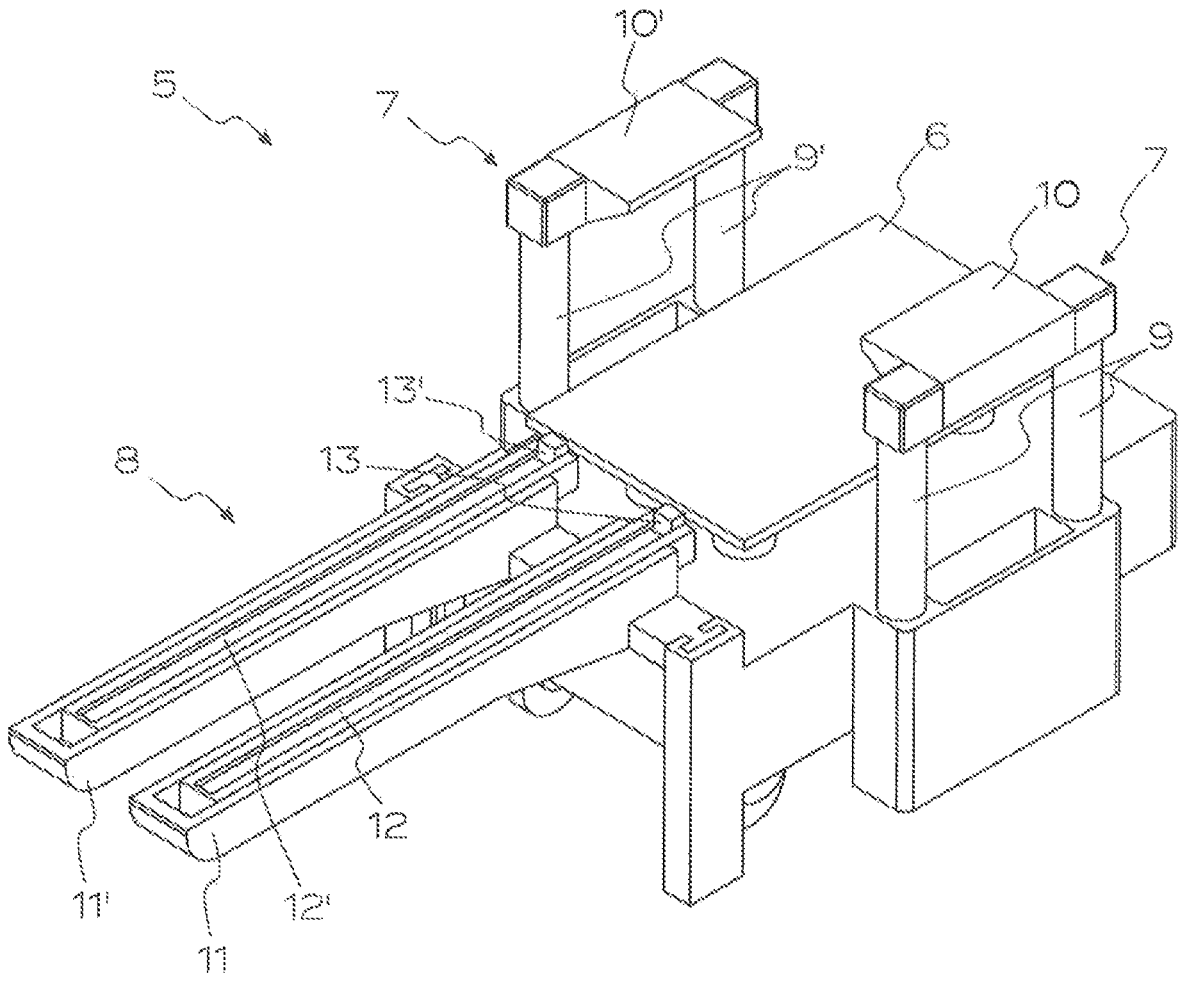
FIG. 1 illustrates a system in a three-dimensional view.

The object of the invention is to solve these and other problems and provide a system and a method to set up an autonomous and temporary photovoltaic power station on land plots that are only temporarily available.

The invention solves these and other problems by means of a system and a method according to the independent claims.

A system according to the invention allows to automatically assemble a solar farm on a free land plot. The land plot does not need preparation, apart from being flat and firm enough. After the temporary solar farm is disassembled, the land is back to what it was with no traces left of its use for solar power generation.

A system according to the invention comprises a multitude of photovoltaic power modules and a multitude of battery modules, wherein the power modules and the battery modules each comprise compatible electrical DC connectors.

This enables that the battery modules can be electrically connected and charged by the power modules. The DC connectors might also provide a mechanical form-fitting connection. In particular, one set of DC connectors of one power module might be connected to one set of DC connectors of another power module. The DC connectors might be equipped with spring-loaded pins so that when one DC connector from one power module is connected to a DC connector from another power module the corresponding pins are pressed against each other and the springs maintain the pressure, securing good electrical connection.

In a preferred embodiment, when two power modules are electrically connected via their electrical connectors, then the photovoltaic panels of both power modules are electrically connected in parallel. This way when many power modules are connected, their photovoltaic panels are connected in parallel. When many power modules are connected, they form a DC BUS running through all connected power modules to which all solar panels are connected.

In another embodiment, the power modules can be connected in series. In another embodiment, every power module might be equipped with a step-up DC/DC converter. This way the electrical current passing through the electrical connectors of the power module will be reduced. In yet another embodiment, the electrical connectors contain apparatus for contactless transfer of energy from one power module to another.

The system further comprises at least one magazine adapted to hold both a number of power modules and a number of battery modules. It preferably holds a vertical stack of power modules and/or battery modules so that the whole stack is kept steady, upright and can easily be transported. This allows to mix and match between the power modules and the battery modules, thus enabling a flexible set up of the photovoltaic power station.

The systems further comprises a robotic vehicle in order to automatically assemble and disassemble the solar farm. The robotic vehicle comprises a preferably extendable holding platform to hold the magazine. The robotic vehicle preferably comprises electrically driven wheels and a power supply.

The robotic vehicle further comprises a manipulator mechanism that is adapted to extract a photovoltaic power module and/or a battery module from the magazine and place it on a ground surface. The manipulator mechanism is also adapted to pick up a photovoltaic power module and/or a battery module from a ground surface and insert it into the magazine. Thus, the robotic vehicle can assemble and disassemble the solar farm.

The robotic vehicle may further be adapted to electrically connect the electrical DC connectors of the photovoltaic power modules and/or battery modules after they are extracted from the magazine and before they are placed on the surface. This may be done by the manipulator mechanism or other means.

The robotic vehicle may further be adapted to electrically disconnect the electrical DC connectors of the photovoltaic power modules and/or battery modules after they are picked up from the surface and before they are inserted into the magazine. This may be done by the manipulator mechanism or other means.

The robotic vehicle may further comprise a lifting mechanism to lift one or more power modules and/or battery modules within the magazine.

The lifting mechanism may be provided in such a way that a single power module and/or a single battery module remains freely movable at the bottom end of the magazine when the one or more power modules and/or battery modules are lifted.

The lifting mechanism might be adapted to lift all power modules and/or all battery modules within the magazine in such a way that a free spot remains at the lower end of the magazine. It might comprise lifting cylinders with extendable fold-out grippers, which are adapted to engage into lifting recesses located at the side walls of the power modules and/or battery modules.

The manipulator mechanism may be further adapted to insert a power module and/or battery module into the free spot at the lower end of the magazine. It might comprise a forklift with two forks, wherein the forks comprise longitudinal rails. Instead of forks, downwards-curved rails may be provided. Magnetic spigots might be arranged movably in the rails. The spigots might be ferromagnetic and magnetized by means of electromagnets or comprise a permanent magnet. The spigots might positively engage into magnetic recesses at the bottom side of the power/battery modules.

The magazine might comprise a pedestal with four legs on its bottom side, which defines an opening that is large enough to allow the robotic vehicle to place itself under the ground plane of the magazine and lift the magazine by extending the holding platform in the upward direction. It might hold a vertical stack of power modules or battery modules. The robotic vehicle can then carry the magazine where needed. The robotic vehicle can take a bottom power/battery module from the magazine and place it on the ground, connecting it to the previously placed power module. The reverse process is also possible.

The magazine might comprise a rectangular frame structure to hold the vertical stack of power modules and/or battery modules in place. The frame structure might comprise a load/unload opening formed by recesses at its front in order to allow the insertion and/or extraction of a power module and/or a battery module. The frame structure might further comprise a ground plane with passive rollers. The rollers allow the easy insertion and extraction of the power/battery module.

The frame structure of the magazine might comprise two electrical DC rail connectors. These might be arranged vertically to connect the electrical DC connectors of the photovoltaic power modules and/or battery modules within the magazine.

The power modules might comprise at least one photovoltaic panel. In a preferred embodiment, the panels are permanently fixed to the power module. In another embodiment, the panels may be foldable, increasing the sunlit surface area when unfolded.

The power modules and the battery modules might comprise substantially identical support frame structures in order to allow an arbitrary stacking of power modules and battery modules in the magazine. In a preferred embodiment, the battery modules have similar dimensions as the power modules and can be handled by the robotic vehicle identically as the power modules.

The power modules and the battery modules might be marked with a unique machine-readable ID, such as a QR code. The robotic vehicle might comprise an optical scanner to read the ID and a position sensor, such as a GPS module. When the autonomous robotic vehicle unloads a power module it can read its individual code and record the position of the said power module. The information of the locations of a whole array of connected power modules can be stored in a database.

In an embodiment of the invention, the robotic vehicle is capable of loading, transporting, unloading, spatially positioning, and electrically connecting power modules and battery modules with one another, thus assembling a temporary solar farm. In the reverse process, the robotic vehicle might locate the photovoltaic power modules and battery modules, disconnect them, and load them into the magazine.

In an embodiment of the invention, the robotic vehicle positions and electrically connects a first power module to a local electrical grid terminal and then builds a temporary structure by connecting more power modules to the first one.

In other embodiments, the solar farm can be operated without a local grid. In such embodiments, the power modules are set up first and are connected to each other. Then at least one battery module is connected to the array of power modules.

The robotic vehicle might first inspect the area where the solar farm is to be built and traverse the area to assess it for obstacles, holes, high vegetation and planarity. If the area does not meet the conditions, the building of the temporary solar farm will not start.

When the robotic vehicle connects a battery module to an array of power modules, it might read its ID code and might address the battery module over the wireless interface. The battery module might report its status, and the robotic vehicle might reply with information of how many power modules are attached. This way the battery management controller can estimate what optimal current it could draw from the array of connected power modules and report their performance during charging.

The battery module might comprise an electrical energy storage, like a rechargeable battery and at least one set of DC connectors for electrical and mechanical connection to power modules, other battery modules or devices that consume electrical energy.

The DC connectors of the battery module and the power module might be spring-loaded to enable a robust mechanical connection of neighbouring power and/or battery modules within a chain of modules.

The battery modules might comprise a battery management controller with a wireless interface. The power modules might also comprise a wireless interface. Both the battery modules and the power modules might be adapted to be in contact with the robotic vehicle through the wireless interface.

The battery management controller may detect arcing along the DC bus connecting the power modules. If arcing is detected, the battery management controller will stop drawing current from the array of connected power modules and report the fault.

When a battery module is fully charged, its battery management controller might alert the robotic vehicle. It might then move to the spot and identify the charged battery module by reading its unique ID. Then the robotic vehicle replaces the charged battery module with a discharged battery module. The charged battery module might be carried to an off-grid consumer device, like an agricultural machine, or it might be connected to a local grid terminal.

The robotic vehicle might also locate a certain power/battery module, identify it by its ID, disconnect it from other power modules and insert it inside the magazine.

The system may further comprise spot-marking devices, which can be put on the ground manually on spots where a solar farm shall be installed. They are equipped with a GPS sensor and transmit their position to the robotic vehicle, so that the autonomous robotic vehicle can access this data.

The system may further comprise local grid terminals connected to the electrical grid with power electronics to convert electricity from the battery modules to whatever voltage is needed. A structure of power modules can be connected to one grid terminal. The robotic vehicle might recharge their onboard battery or discharge it to the local grid.

The system may further comprise closed automatic storage boxes to store and service the power modules when they are not used. Autonomous robotic vehicles can open the storage areas when they bring in or take out magazines full of power modules.

In a preferred embodiment, the automatic storage is movable along with several robotic vehicles and magazines full of power modules inside. The automatic storage can be arranged as a shipping container so that it can be loaded on a road vehicle and transported to another location where a temporary solar farm shall be set up.

The invention further relates to methods to set up a solar farm. Such methods might be implemented in ERP (Enterprise Resource Planning) software.

In one embodiment, the user draws lines on a digital map application to mark a travel path and enclose an area where the solar farm should be built.

In another embodiment, the user can physically put spot-marking devices on the ground. They will then transmit their GPS coordinates and appear on the digital map application defining a travel path and the area for the solar farm to be built.

In another embodiment, the user can use a software graphic tool to design how the power modules should be laid down. Icons of power modules to scale can be dragged and dropped to position to form the desired structure.

In another embodiment, an algorithm is used to automatically design a layout for the farm. For instance, it can connect the first power module to a grid port and then add more power modules in a straight line, until a boundary is reached. It may add perpendicular lines attached to the first line, until the area is filled, or it runs out of available power modules.

Solar farm layouts might be stored in the user profile, possibly in a cloud-based system. Information about operational solar farms can be automatically sent to a utility company. Also, information about grid load can be sent to the user. In case of high demand, the system can automatically initiate the building process to add more power modules if sun is available. Also, the system may automatically follow the weather forecast and deploy the solar farm if sunny weather is expected or disassemble the solar farm in case bad weather is expected. The user may also give commands and activate a certain farm layout or deactivate other farm layout, depending on which plot of land is available for solar energy generation at a given moment.

During operation, the robotic vehicle may encounter unexpected obstacles. In such a case, it will stop and send an alarm after which the system may alert a human operator.

Live video from the autonomous robotic vehicle might be sent to him for assessment. The operator may remotely navigate the vehicle to avoid the obstacle. If the obstacle is hard to avoid, the operator may send a ground team to assist.

The ERP system may have access to data for electricity prices by the hour and forecast for the next few days. Based on this info the ERP may decide autonomously to deploy the temporary solar farm.

Further features of the invention will become apparent from the attached claims, description of particular embodiments, and figures. The invention is now described in more detail using the attached figures.

FIG. 1 shows an autonomous robotic vehicle 5 according to the invention. It comprises four wheels with 360 degrees vectoring driven by an electric motor and mounted to a vertically extendable holding platform 6, which is strong enough to lift a magazine 4 filled with power modules 1, 1', 1" and/or battery modules 2, 2', 2". Each wheel is driven by an electric motor and guidance system so that every wheel can precisely be adjusted at a given angle. Precise stepper motors are used for both propulsion and guidance. In other embodiments, the holding platform 6 can be based on other electric motors, tracks, non-rotating legs, or propellers.

The robotic vehicle 5 further comprises a control unit, that is not shown. It consists of a computer with some considerable computational, digital memory, interface resources, software for 3D imaging, algorithms on how to assemble/disassemble the power and battery modules and obstacle avoidance. It further comprises digital vision systems, preferably at least two digital cameras and other sensors like LIDAR.

The robotic vehicle 5 further comprises an onboard battery and at least one set of DC electrical connectors to connect to a power module and charge its onboard battery. The robotic vehicle 5 further comprises a positioning system, like GPS, and a wireless communication system. On both sides of the vehicle 5, a lifting mechanism 7 is provided which is adapted to lift one or more power modules 1, 1', 1" and/or battery modules 2, 2', 2" within the magazine 4. In this embodiment, the lifting mechanism 7 comprises lifting cylinders 9, 9' with extendable fold-out grippers 10, 10'.

The grippers 10, 10' are adapted to engage into lifting recesses 21, 21' located at the side walls of the power modules 1, 1', 1" and/or battery modules 2, 2', 2". In FIG. 1, the grippers 10, 10' are unfolded and the cylinders 9, 9' are fully extended to its upper position.

At the front of the vehicle 5, a manipulator mechanism 8 is provided, that is adapted to pull a power module 1, 1', 1" and/or a battery module 2, 2', 2" from the bottom end of the magazine 4. The manipulator mechanism 8 comprises a forklift with two forks 11, 11'. The forks 11, 11' comprise longitudinal rails 12, 12', in which magnetic spigots 13, 13' are movably arranged. The magnetic spigots 13, 13' can be moved through a control mechanism along the rails 12, 12' and are adapted to positively engage into magnetic recesses 14, 14' at the bottom side of the power modules 1, 1', 1" and/or battery modules 2, 2', 2".

Figure 2:
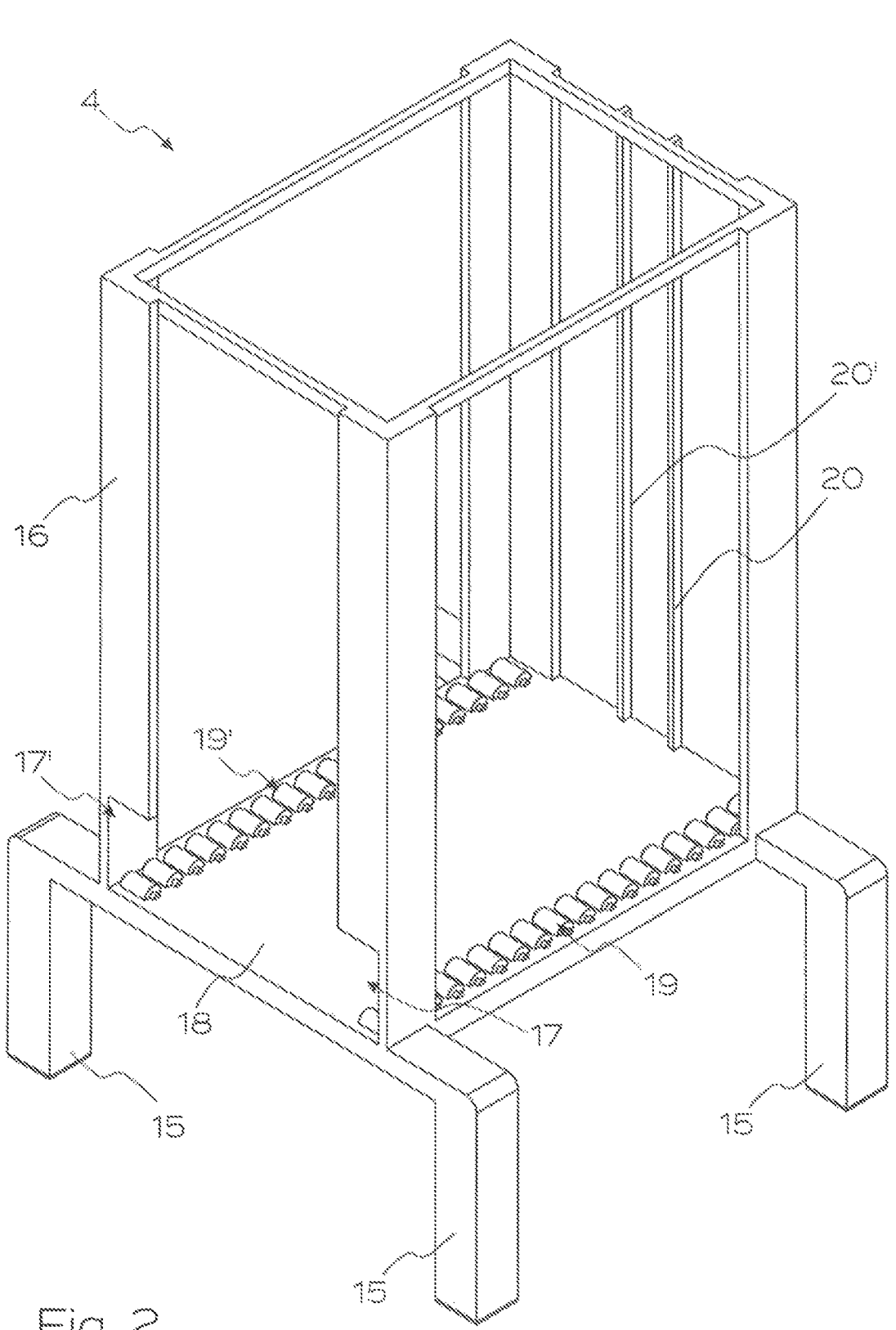
FIG. 2 illustrates a magazine for a system in a three-dimensional view.

FIG. 2 shows a magazine 4 to hold the power modules 1, 1', 1" and/or the battery modules 2, 2', 2" according to the invention. The magazine 4 comprises a rectangular frame structure 16 with a ground plane 18 to hold a multitude of power modules 1, 1', 1" and/or battery modules 2, 2', 2" safely in place. At the front of the ground plane 18, frame structure recesses 17, 17' allow the extraction or insertion of a single power module 1, 1', 1" and/or battery module 2, 2', 2".

At the ground plane 18, two rows of passive rollers 19, 19' are provided to allow an easy insertion or extraction of a power module 1, 1', 1" and/or battery module 2, 2', 2". At the back of the frame structure 16, electrical DC rail connectors allow to connect the power modules 1, 1', 1" and/or battery modules 2, 2', 2" within the magazine 4 in series.

The frame structure 16 of the magazine 4 stands on a pedestal 15, which leaves a bottom opening that is large enough to allow the robotic vehicle 5 to place itself under the ground plane 18 of the magazine 4 and lift the magazine 4 by extending the holding platform 6 against the ground plane 18.

Figure 3:
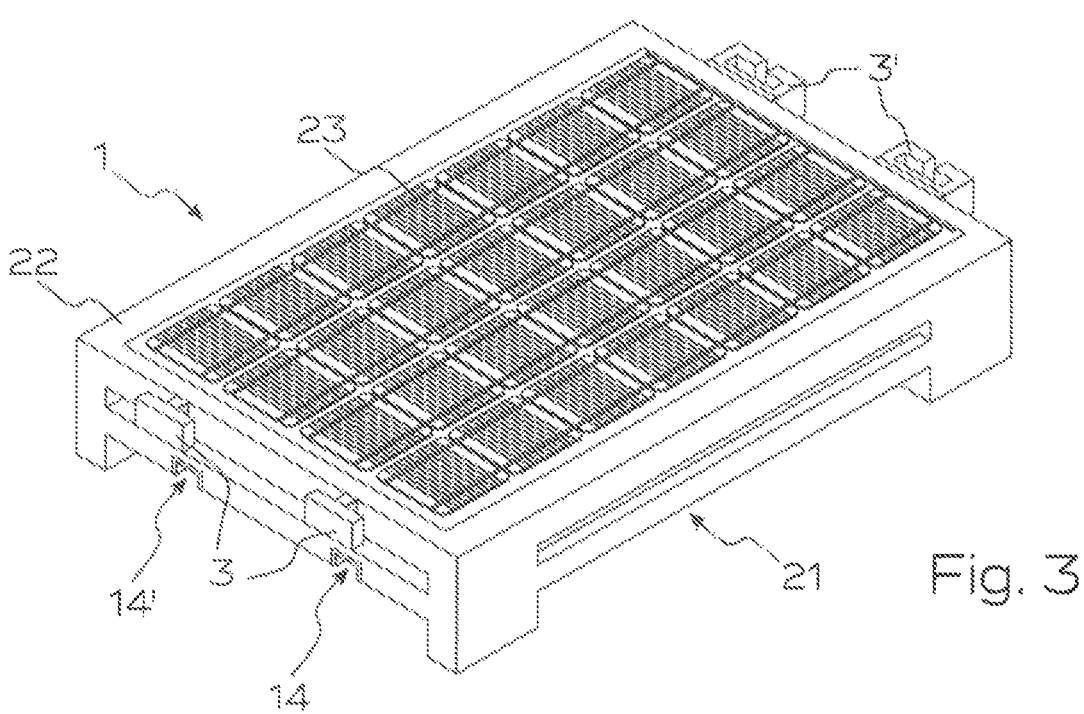
FIG. 3 illustrates a power module for a system in a three-dimensional view.

FIG. 3 shows a power module 1 according to the invention, comprising cells 23, front DC connectors 3 and rear DC connectors 3'. The power module 1 has a substantially rectangular shape with a frame structure 22 that leaves lifting recesses 21 at its bottom in order to form-fittingly engage with the grippers 10, 10' of the robotic vehicle 5. The DC connectors 3, 3' are electrically isolated from the frame structure 22. The frame structure 22 further defines two magnetic recesses 14, 14' at its front in order to engage with the magnetic spigots 13, 13' of the forks 11, 11' of the robotic vehicle 5.

Figure 4:
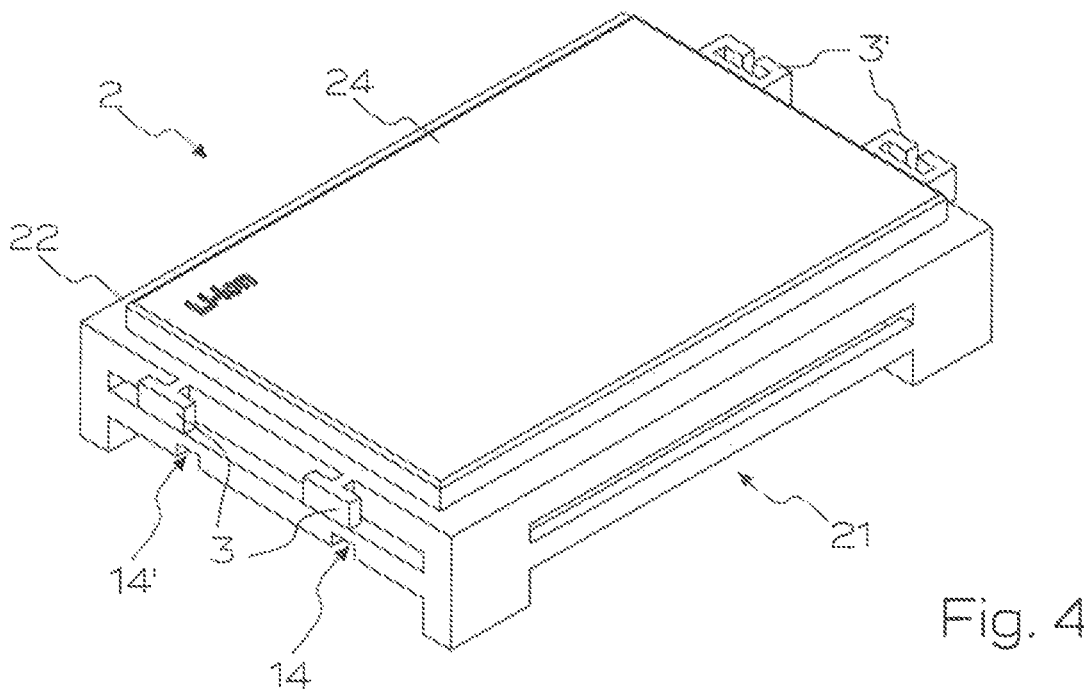
FIG. 4 illustrates a battery module for a system in a three-dimensional view.

FIG. 4 shows a battery module 2 according to the invention, comprising a rechargeable battery, front DC connectors 3 and rear DC connectors 3'. The battery module 2 has a substantially rectangular shape with a frame structure 22 that leaves lifting recesses 21 at its bottom in order to form-fittingly engage with the grippers 10, 10' of the robotic vehicle 5. The DC connectors 3, 3' are electrically isolated from the frame structure 22. The frame structure 22 further defines two magnetic recesses 14, 14' at its front in order to engage with the magnetic spigots 13, 13' of the forks 11, 11' of the robotic vehicle 5.

FIGS. 5a-5d illustrate the process of extracting a power module 1 from the magazine 4. During the process, the remaining power modules 1', 1" are slightly lifted within the magazine 4 to make the lowest power module 1 free from the weight of the other power modules above it. After the power module 1 in the lowest position is pulled out of the magazine, the power modules 1', 1" remaining in the stack are brought down to the lowest position.

In the reverse process, which is not illustrated, a power module outside of the magazine is slid into the lower position inside the magazine while the power modules inside the magazine are lifted one position up and the new module is slid through the load/unload opening into the magazine at the lowest position. After that, the other modules are brought down on top of the newly inserted in the lowest slot power module.

In another embodiment, which is not illustrated, an additional elevator-like mechanism is added to the robotic vehicle that can access and take out any module in the vertical stack inside the magazine. The loading/unloading of battery modules in the power module magazine is a similar process to loading/unloading of power modules.

Figure 5A:
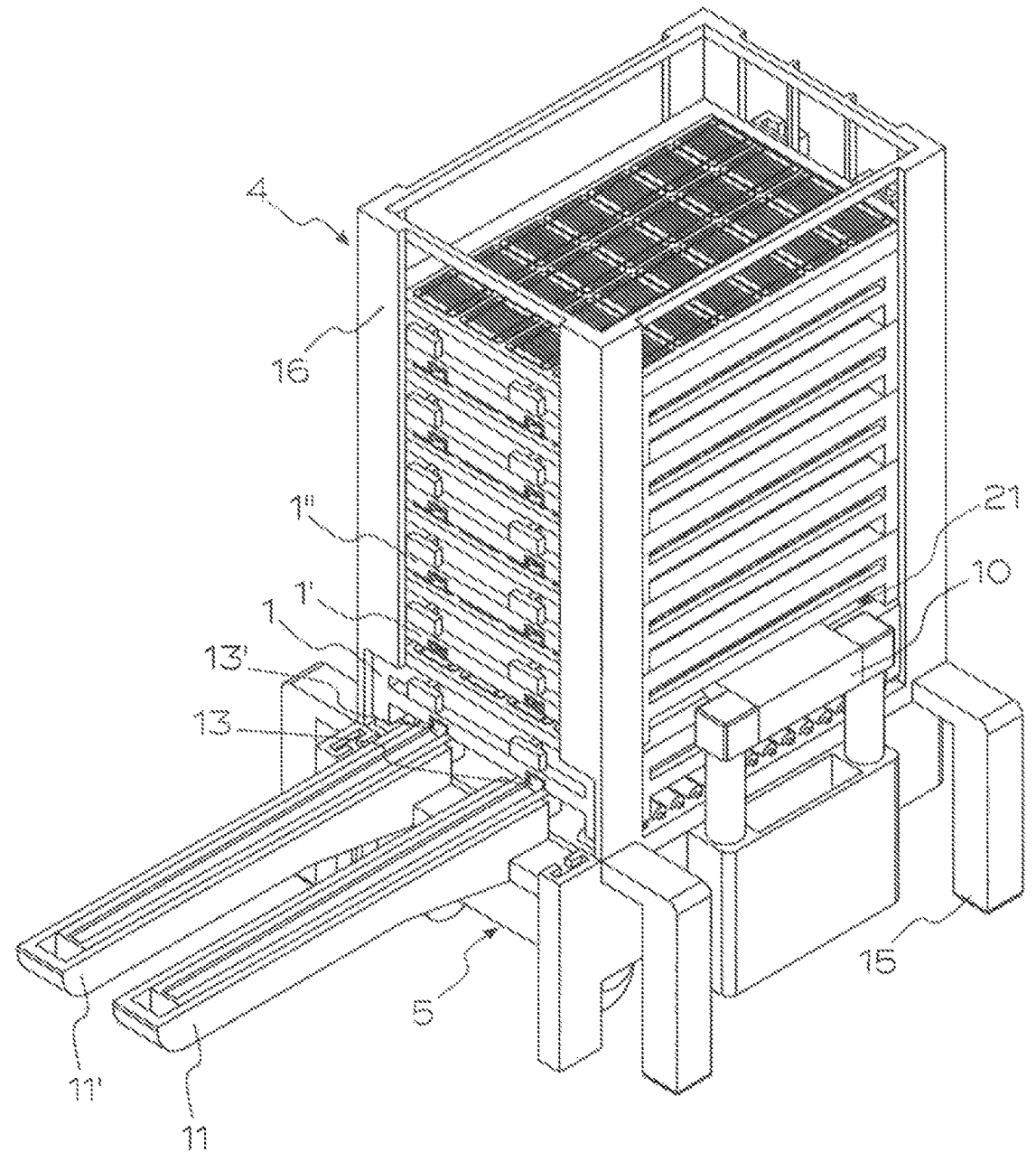
FIG. 5A illustrates the process of extracting a power module from the magazine in a system in a three-dimensional view.

FIG. 5a shows a stack of power modules 1, 1', 1" loaded into the magazine 4, and a robotic vehicle 5 arranged under the ground plane 18 of the magazine 4.

The grippers 10, 10' of the lifting mechanism 7 are unfolded and form-fittingly engaged with the recesses 21, 21' of the power module 1. By extending the lifting cylinders 9, 9', the robotic vehicle 5 lifts the power module 1', 1" within the magazine 4, so that the bottom power module 1 becomes freely movable. The magnetic spigots 13, 13' of the forks 11, 11' are then moved along the longitudinal rails 12, 12' under the power module 1 and form-fittingly engage with the magnetic recesses 14, 14' at its bottom.

Figure 5B:
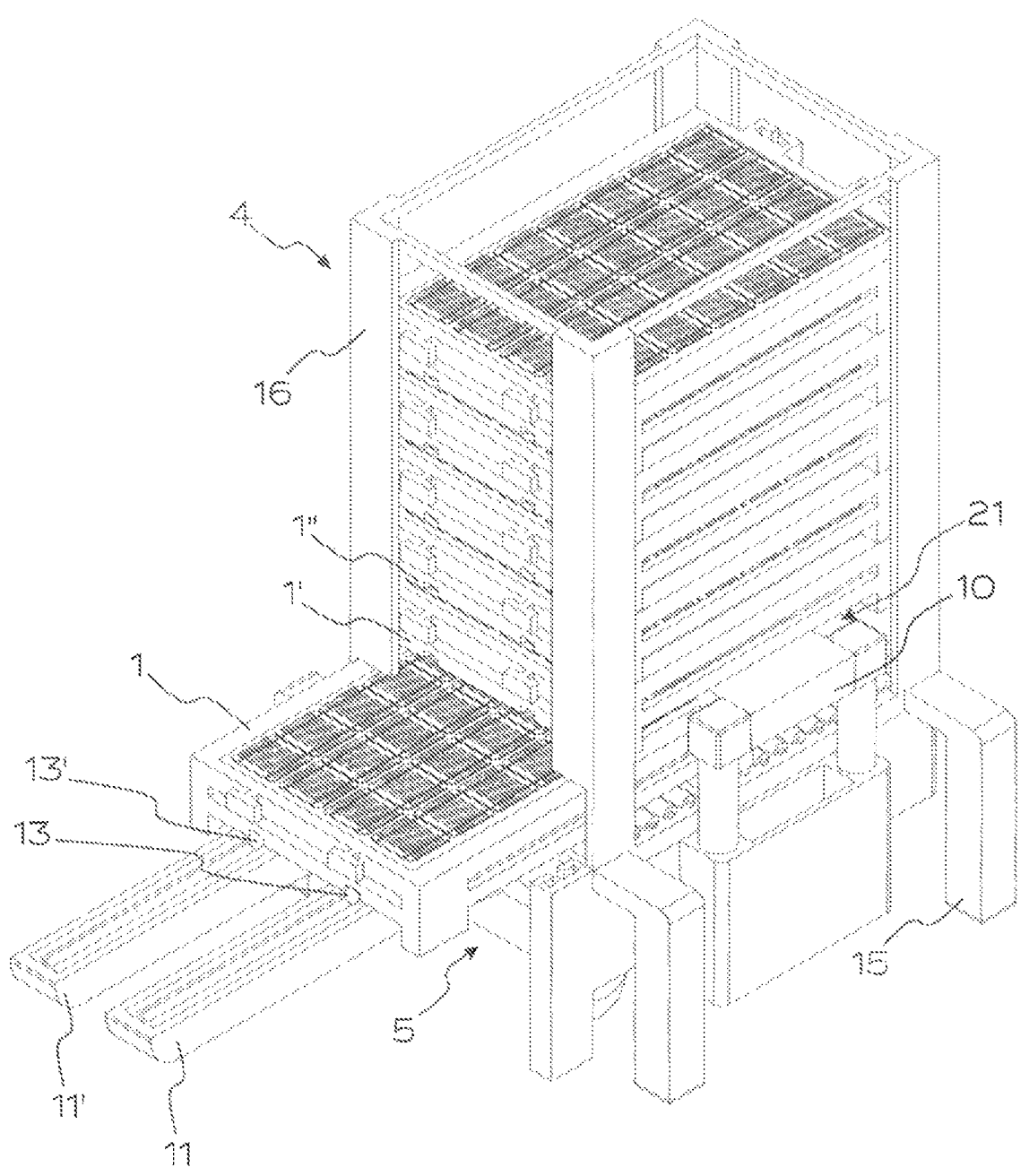
FIG. 5B illustrates the process of extracting a power module from the magazine in a system in a three-dimensional view.

In FIG. 5b, the magnetic spigots 13, 13' are moved along the longitudinal rails 12, 12' of the forks 11, 11' and, through the magnetic coupling with the magnetic recesses 14, 14', carry the power module 1 along.

Figure 5C:
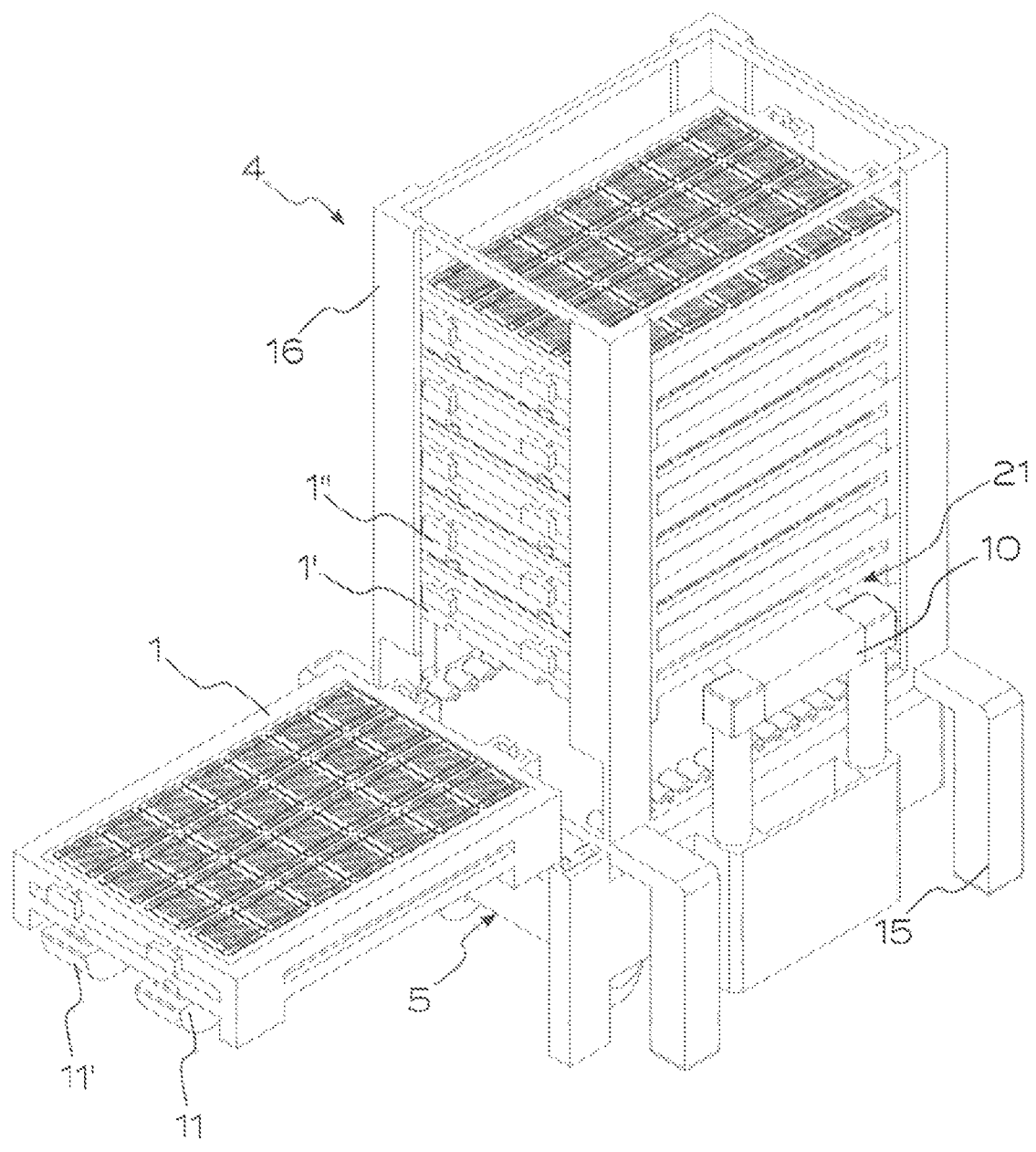
FIG. 5C illustrates the process of extracting a power module from the magazine in a system in a three-dimensional view.

In FIG. 5c, the magnetic spigots 13, 13' have reached the tips of the forks 11, 11' and the power module 1 is completely extracted from the magazine 4. The lifting cylinders 9, 9' are then lowered to bring the power module 1' to the bottom position in the magazine 4.

Figure 5D:
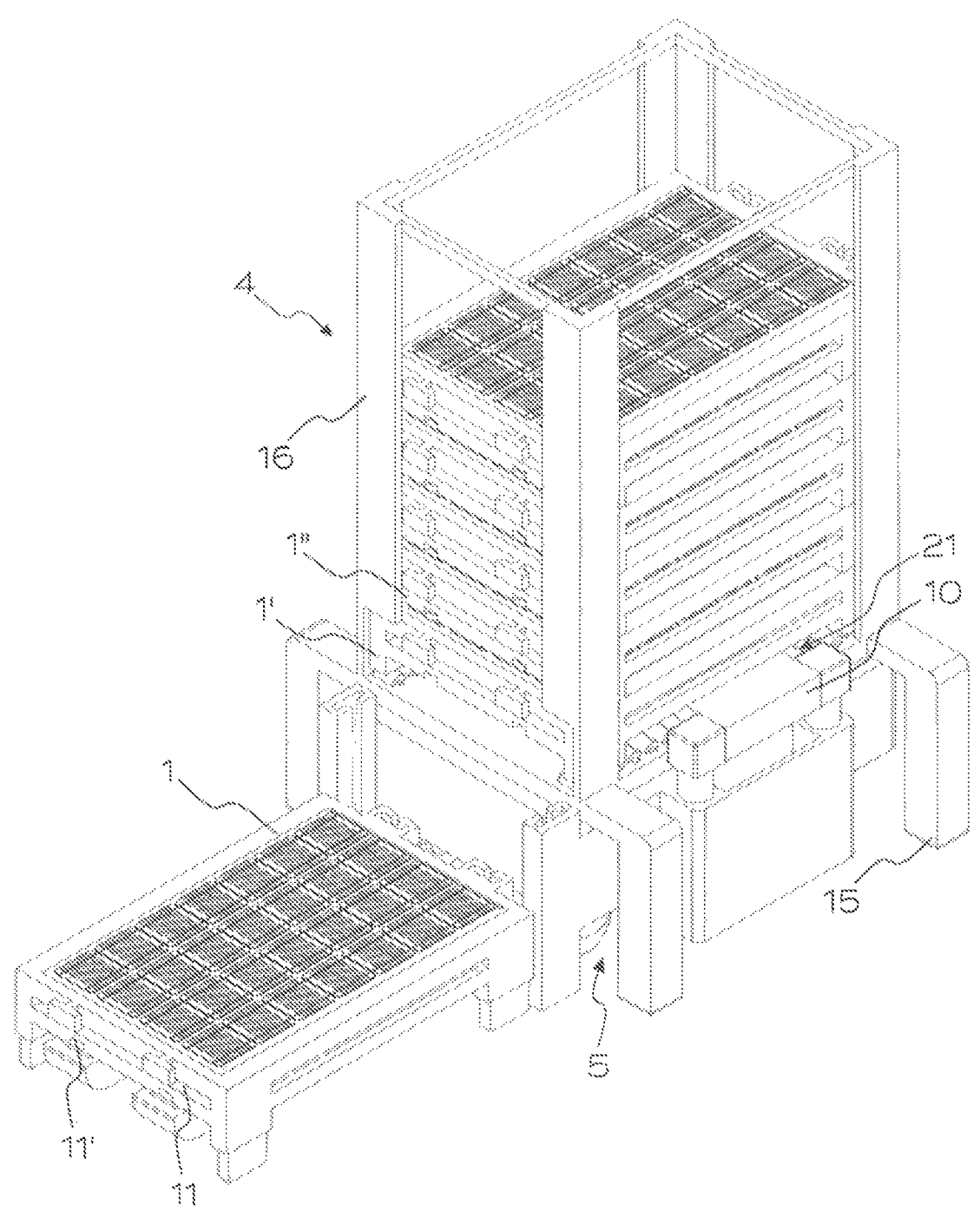
FIG. 5D illustrates the process of extracting a power module from the magazine in a system in a three-dimensional view.

In FIG. 5d, the forks 11, 11' of the forklift are lowered in order to place the power module 1 on the ground. The lifting cylinders 9, 9' are in their lower position and the power module 1' is at the bottom position in the magazine 4.

Figure 5E:
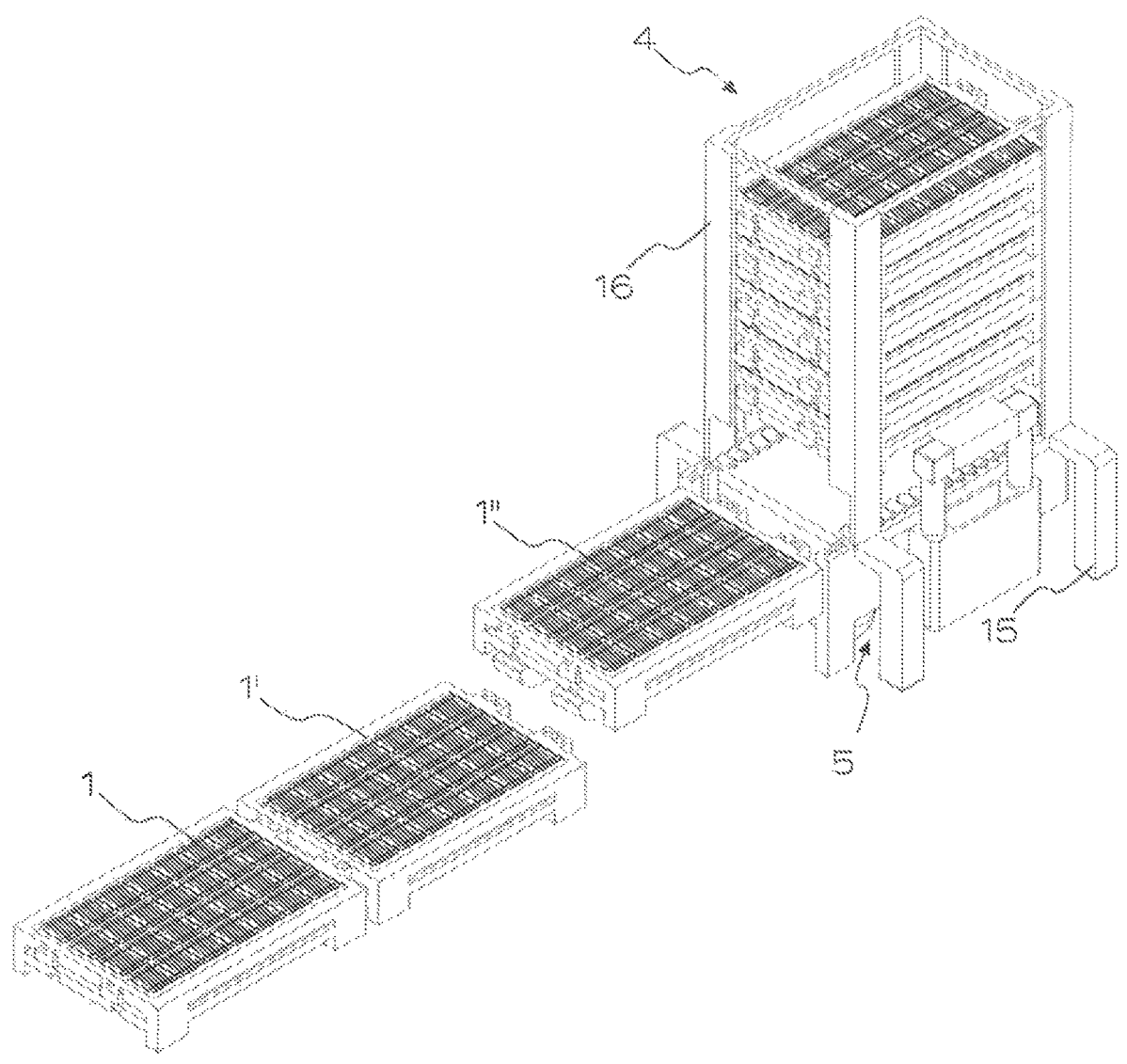
FIG. 5E illustrates the process of connected power modules in a three-dimensional view.

FIG. 5e shows two positioned and electrically connected power modules 1, l' and a third photovoltaic power module 1" in the process of being connected to the previous two.

Figure 6:
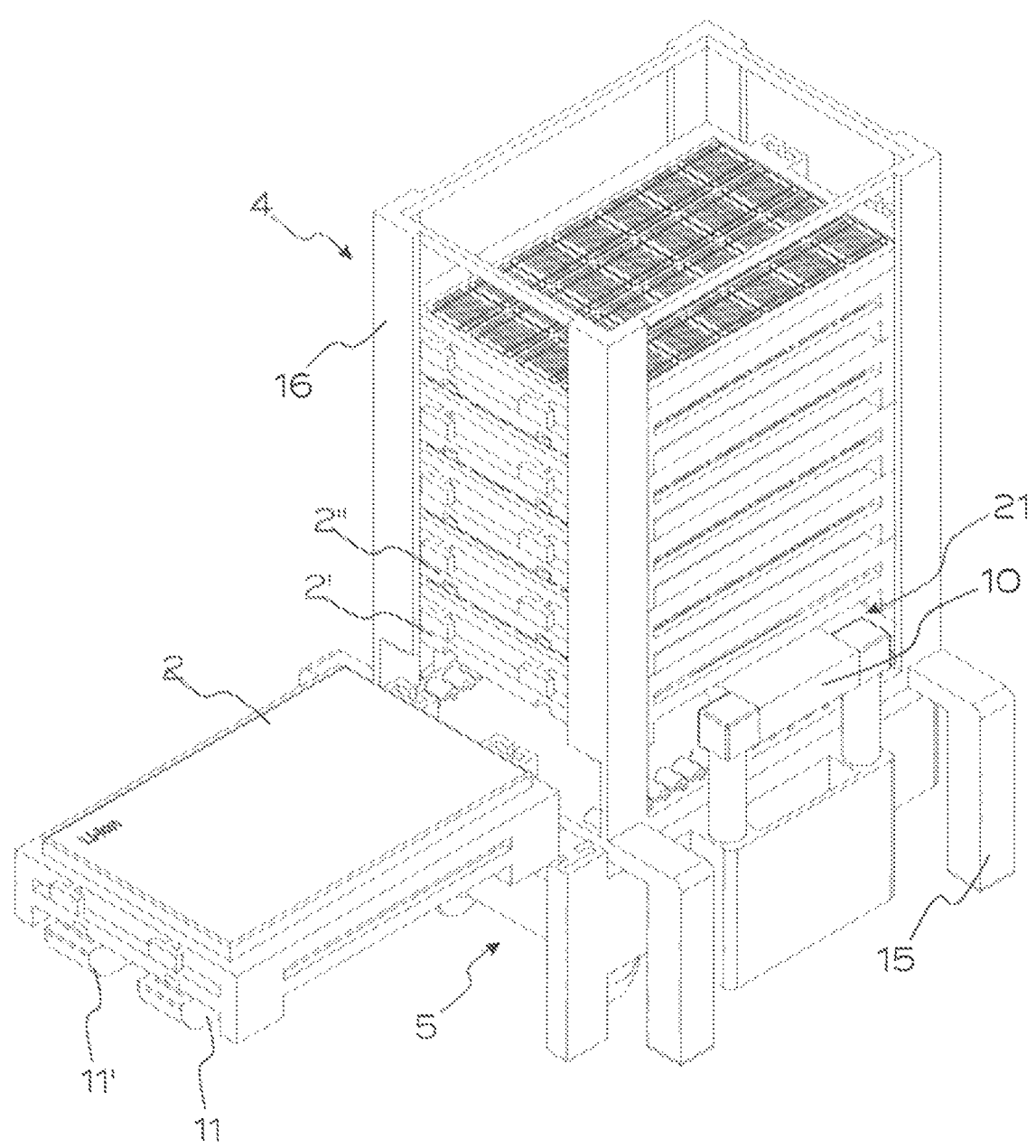
FIG. 6 illustrates a battery module being pulled out of the magazine in a three- dimensional view.

FIG. 6 shows a battery module 2 being pulled out of the magazine 4. In this example, the magazine 4 holds several power modules 1, 1', 1" and a single battery module 2. Since the frame structures 22 of the power modules 1, 1', 1" and the battery module 2 are identical, the magazine 4 can be used to hold both kind of modules at the same time.

In a further embodiment, that is not illustrated, the magazine 4 is filled with two or more battery modules 2, 2', 2", which are all connect to the DC rail connectors 20, 20', which cover all vertical positions in the magazine. Thus, electrical energy can be drawn from all battery modules inside the magazine, turning the magazine into a large battery bank.

In other embodiments of the invention, the power modules 1, 1', 1" are electrically connected before they are placed on the surface ground. For this, the power module 1 can be held in a retracted position with the connectors 3' reaching into the magazine 4, so that when the next module 1' is lowered inside the magazine 4, it is directly connected with the module 1 through the matching connectors 3, 3'. To allow a smooth placement of the connected string of power modules 1, 1', the forks 11, 11' might be curved downwards to the ground. The connected modules 1, 1', 1" are then pushed by the spigots 13, 13' in steps to slide in an arranged chain formation to the ground, while the robotic vehicle 5 moves slowly backwards so that part of the chain of modules 1, 1', 1" which is on the ground does not move relative to the ground. The robotic vehicle might stop briefly every time when a new module needs to connect to the chain of modules. There should be some limited flexibility between connectors of two connected modules. The electrical connectors might be spring-loaded to keep a good electrical and mechanical contact after the modules are laid on the ground.

In these embodiments, disassembling will be a reverse process. The forks 11, 11' are realized as curved rails and are positioned under the first module 1, 1', 1". The robotic vehicle 5 gently moves forward to lift the first module on the curved rails, until it is guided to the lowest position in the magazine 4. Then the robotic vehicle stops for a moment, the first module is lifted inside the magazine and gets disconnected from the chain. Then the process repeats. Such embodiment will be both simpler and faster in operation.

LIST OF REFERENCE NUMERALS 1, 1', 1" Photovoltaic power module
2, 2', 2" Battery module
3, 3' Electrical DC connector
4 Magazine 5 Robotic vehicle
6 Extendable holding platform
7 Lifting mechanism
8 Manipulator mechanism
9, 9' Lifting cylinder
10, 10' Fold-out gripper
11, 11' Fork
12, 12' Longitudinal rail
13, 13' Magnetic spigot
14, 14' Magnetic recess
15 Pedestal
16 Frame structure
17, 17' Frame structure recess
18 Ground plane
19, 19' Rollers
20, 20' Electrical DC rail connector
21, 21' Lifting recess
22 Frame structure
23 Photovoltaic cell
24 Rechargeable battery

What is claimed is:

1. A system to set up an autonomous temporary solar farm, comprising:
   a. a multitude of photovoltaic power modules (1, 1', 1") and
   b. a multitude of battery modules (2, 2', 2"), wherein
   c. the photovoltaic power modules (1, 1', 1") and the battery modules (2, 2', 2") each comprise compatible and spring-loaded electrical DC connectors (3, 3'), so that the battery modules (2, 2', 2") can be electrically connected to and charged by the photovoltaic power modules (1, 1', 1"),
   characterized in that the system comprises
   a. at least one magazine (4) adapted to hold both the photovoltaic power modules (1, 1', 1") and the battery modules (2, 2', 2"),
   b. at least one robotic vehicle (5) adapted to assemble and disassemble the solar farm and comprising
      a. a holding platform (6) to hold the magazine (4), and
      b. a manipulator mechanism (8) that is adapted to
         i. extract a photovoltaic power module (1, 1', 1") and/or a battery module (2, 2', 2") from the magazine (4) and place it on a ground surface, and/or
         ii. pick up a photovoltaic power module (1, 1', 1") and/or a battery module (2, 2', 2") from a ground surface and insert it into the magazine (4).

2. The system according to claim 1, characterized in that the robotic vehicle (5) is adapted to electrically connect the electrical DC connectors (3, 3') of the photovoltaic power modules (1, 1', 1") and/or battery modules (2, 2', 2") after they are extracted from the magazine (4) and before they are placed on the surface.

3. The system according to claim 1, characterized in that the robotic vehicle (5) is adapted to electrically disconnect the electrical DC connectors (3, 3') of the photovoltaic power modules (1, 1', 1") and/or battery modules (2, 2', 2") after they are picked up from the surface and before they are inserted into the magazine (4).

4. The system according to claim 1, characterized in that the robotic vehicle (5) comprises a lifting mechanism (7), wherein
   d. the lifting mechanism (7) is adapted to lift one or more photovoltaic power modules (1, 1', 1") and/or battery modules (2, 2', 2") within the magazine (4), and wherein e. the lifting mechanism (7) optionally comprises lifting cylinders (9, 9') with extendable fold-out grippers (10, 10'), which are adapted to engage into lifting recesses (21, 21') located at side walls of the photovoltaic power modules (1, 1', 1") and/or battery modules (2, 2', 2").

5. The system according to claim 1, characterized in that the manipulator mechanism (8) comprises a forklift with two forks (11, 11'), wherein
   f. the forks (11, 11') comprise longitudinal rails (12, 12'), wherein
   g. magnetic spigots (13, 13') are movably arranged in the rails (12, 12'), and wherein
   h. the magnetic spigots (13, 13') are adapted to positively engage into magnetic recesses (14, 14') at a bottom side of the photovoltaic power modules (1, 1', 1") and/or battery modules (2, 2', 2").

6. The system according to claim 1, characterized in that the magazine (4) on its bottom side comprises a pedestal (15) which defines an opening that is large enough to allow the robotic vehicle (5) to place itself under the magazine (4) and lift the magazine (4) by extending the holding platform (6) upwards.

7. The system according to claim 1, characterized in that the magazine (4) comprises
   i. a rectangular frame structure (16) to hold the photovoltaic power modules (1, 1', 1") and/or battery modules (2, 2', 2") in place, wherein
   j. the frame structure (16) comprises recesses (17, 17') at its front in order to allow the insertion and/or extraction of a photovoltaic power module (1, 1', 1") and/or a battery module (2, 2', 2"), wherein
   k. the frame structure (16) further comprises a ground plane (18) with passive rollers (19, 19').

8. The system according to claim 7, characterized in that the frame structure (16) of the magazine (4) comprises electrical DC rail connectors (20, 20') which are arranged vertically to connect the electrical DC connectors (3, 3') of the photovoltaic power modules (1, 1', 1") and/or battery modules (2, 2', 2") within the magazine (4).

9. The system according to claim 1, characterized in that the photovoltaic power modules (1, 1', 1") and the battery modules (2, 2', 2") comprise substantially identical support frame structures (22) in order to allow an arbitrary stacking of photovoltaic power modules (1, 1', 1") and battery modules (2, 2', 2") in the magazine (4).

10. The system according to claim 1, characterized in that the photovoltaic power modules (1, 1', 1") and the battery modules (2, 2', 2") are marked with unique machine-readable codes and the robotic vehicle (5) comprises a scanner to read the codes.

11. The system according to claim 1, characterized in that the battery modules (2, 2', 2") and/or the power modules (1, 1', 1") comprise a wireless interface, which is adapted to be in contact with the robotic vehicle (5).

12. The system according claim 1, characterized in that at least one spot-marking device is provided, which comprises a position sensor and a wireless interface, wherein the spot-marking device is adapted to be in contact with the robotic vehicle (5).

13. The system according claim 1, characterized in that at least one automatic storage box is provided, in which power modules (1, 1', 1") and/or battery modules (2, 2', 2") can be stored and/or serviced, and wherein the storage box is arranged in a shipping container.

* * * * *